US008146076B1

(12) United States Patent
Shumway et al.

(10) Patent No.: US 8,146,076 B1
(45) Date of Patent: Mar. 27, 2012

(54) SYSTEMS AND METHODS FOR CUSTOMIZING BOOT DISK IMAGES USING PRIORITIZATION

(75) Inventors: Ken H. Shumway, Orem, UT (US); J. Dan Broadhead, Salt Lake City, UT (US)

(73) Assignee: Symantec Corporation, Mountain View, CA (US)

( * ) Notice: Subject to any disclaimer, the term of this patent is extended or adjusted under 35 U.S.C. 154(b) by 1213 days.

(21) Appl. No.: 11/864,985

(22) Filed: Sep. 29, 2007

Related U.S. Application Data

(60) Provisional application No. 60/994,046, filed on Sep. 17, 2007.

(51) Int. Cl.
*G06F 9/445* (2006.01)
*G06F 9/44* (2006.01)

(52) U.S. Cl. .................... 717/174; 717/168; 717/169

(58) Field of Classification Search .................. None
See application file for complete search history.

(56) References Cited

U.S. PATENT DOCUMENTS

| | | | | |
|---|---|---|---|---|
| 5,325,532 | A * | 6/1994 | Crosswy et al. | 713/2 |
| 5,764,593 | A * | 6/1998 | Turpin et al. | 713/2 |
| 5,778,395 | A * | 7/1998 | Whiting et al. | 1/1 |
| 5,930,513 | A * | 7/1999 | Taylor | 717/174 |
| 6,144,992 | A * | 11/2000 | Turpin et al. | 709/208 |
| 7,127,712 | B1 * | 10/2006 | Noble et al. | 717/173 |
| 7,228,326 | B2 * | 6/2007 | Srinivasan et al. | 709/200 |
| 7,516,206 | B2 * | 4/2009 | Henseler et al. | 717/168 |
| 7,549,148 | B2 * | 6/2009 | Cross et al. | 717/174 |
| 7,653,901 | B2 * | 1/2010 | Tameshige et al. | 717/169 |
| 7,882,068 | B2 * | 2/2011 | Schack et al. | 707/639 |
| 7,882,345 | B1 * | 2/2011 | Christensen | 713/2 |
| 2002/0178439 | A1 * | 11/2002 | Rich et al. | 717/174 |
| 2004/0123285 | A1 * | 6/2004 | Berg et al. | 717/174 |
| 2004/0194082 | A1 * | 9/2004 | Purkeypile et al. | 717/174 |
| 2007/0174834 | A1 * | 7/2007 | Purkeypile et al. | 717/174 |
| 2007/0240154 | A1 * | 10/2007 | Gerzymisch et al. | 717/174 |

OTHER PUBLICATIONS

Altiris, Inc. "Altiris Deployment Solution 6.5", Feb. 2006, Altiris Inc. [retrieved on Aug. 2, 2011]; Retrieved from Internet <URL:http://web.archive.org/web/20060511111520/http://www.altiris.com/Support/Documentation.aspx>; pp. 1-553.*
Unknown auther, "Preparing to Deploy Windows Vista Chapter 1", 2007 Wiley Media, published online; [retrieved on Dec. 22, 2011]; Retrieved from Internet <URL:http://media.wiley.com/product_data/excerpt/59/04701653/047016539.pdf>;pp. 1-38.*

(Continued)

*Primary Examiner* — Thuy Dao
*Assistant Examiner* — Xi D Chen
(74) *Attorney, Agent, or Firm* — Advantedge Law Group (57) ABSTRACT

The disclosure is directed to systems and methods for customizing boot disk images using prioritization. In one example, a series of source files are copied to a staging area. Earlier received files are overridden by later received files of the same name. Pre-boot operating system files are copied first, followed by a software manufacturer's supplied files, then an original equipment manufacturer's supplied files, and finally user supplied files. Since each file is overridden by a later one, the prioritizing of copies to the staging area presents a prioritized file structure to create a boot disk image. Commands are run to further modify the files. The files are compiled into a boot disk image.

19 Claims, 6 Drawing Sheets

OTHER PUBLICATIONS

Edge, et al., "Enterprise Mac Administrator's Guide, Chapter 6 Mass Deployment", Springer 2009; [retrieved on Dec. 22, 2011]; Retrieved from Internet <URL:http://www.springerlink.com/content/xm365701415nr144/>;pp. 287-354.*

Gordon, "The Modular Applicatin Customizing System", IBM System Journal, 1980; [retrieved on Dec. 23, 2011]; Retrieved from Internet <URL:http://ieeexplore.ieee.org/stamp/stamp.jsp?tp=&arnumber=5387931>; pp. 521-541.*

* cited by examiner

SYSTEMS AND METHODS FOR CUSTOMIZING BOOT DISK IMAGES USING PRIORITIZATION

BACKGROUND INFORMATION

Successful creation of boot disk images requires compiling files obtained for a wide variety of parties including computer suppliers, corporations, organizations, to generally name a few. The boot disk images are intended to save time by streamlining the deployment of computers within the respective entities. Boot disk images are capable of being created for a variety of environments because the user can modify or add to the original source files to achieve a desired result. In this way, boot disk images save time and money.

Unfortunately, these modifications can also be costly. For example, if the modification is performed incorrectly or simply goes wrong, the boot disk image creation environment can be corrupted. Modifications to particular files and the addition of specific files may be needed for particular boot images. The files used to create the image are modified in place and pulled by the boot disk image creator to be incorporated in the boot disk image. However, once the change has been made, the original file is altered and will need to be changed for each subsequent different hardware requirement.

Similarly, the modifications can be tedious to make if a lot of modifications are required or when many boot disk images need to be created. Since there are many different hardware and software requirements even within one entity, many different modifications need to be made and often to the same file. Constantly modifying files lends itself to long man hours of trial and error along with the risk of data corruption.

While it is possible to effectively create boot disk images by modifying or adding to the original source files, this approach is resource intensive and may require a significant amount of man hours and the risk of data corruption. Accordingly, this is not a practical solution for all situations of customizing boot disk images.

BRIEF SUMMARY

The disclosure is directed to systems and methods for customizing boot disk images using prioritization.

It should be appreciated that the examples disclosed herein can be implemented in numerous ways, including as one or more processes, apparatuses, systems, devices, methods, computer readable media, or computer program products embodied on computer readable media.

In one example, sets of files are collected and copied to a staging area in order of priority. Earlier received files are overridden by later received files of the same name. The first set of files copied to the staging area includes pre-boot operating system files which are specific to the operating system chosen to install. The second set of files copied to the staging area includes software manufacturer files, that is, files provided by a manufacturer of the software used to create a boot disk image. The third set of files includes original equipment manufacturer (OEM) files. As each set of files is copied to the staging area, previous files in the staging area with the same name are overwritten, which creates an updated collection of files. A user defined set of commands is then executed to further modify the staging area. The files in the staging area are compiled to create a customized boot disk image. Additional details and exemplary embodiments are disclosed below.

BRIEF DESCRIPTION OF THE DRAWINGS

Various embodiments are described with reference to the accompanying drawings, wherein like reference numbers designate like elements, and in which.

DETAILED DESCRIPTION

Embodiments described herein will be best understood by reference to the drawings. It will be readily understood that the components generally described and illustrated in the drawings herein, could be arranged and designed in a variety of different configurations. Thus, the following detailed description, as represented in the drawings, is not intended to limit the scope of the disclosure but is merely representative of certain embodiments.

General Concepts

Exemplary systems and methods for customizing boot disk images using prioritization are described herein. As used herein, the term "computer program" may refer broadly to any set of computer readable instructions embodied on one or more computer readable media, the instructions being executable by one or more computing devices. Computer programs may include, but are not limited to, applications, subroutines, and operating systems.

Systems and methods for customizing boot disk images using prioritization disclosed herein can eliminate or at least significantly reduce file corruption and increase flexibility when customizing software to create a boot disk image. For example, when a pre-boot execution environment (PXE) image is created, certain files must be included, such as operating system files, driver files, and the like. These files can be updated or replaced by a user, but at a cost of risking data corruption since they directly modify or replace original files. To avoid data corruption, a prioritization of included files is used to configure the PXE image. Sets of files are copied to a staging area in sequence, with later copied sets of files overriding earlier copied sets of files. The PXE image is further configured by copying a set of files supplied by an original equipment manufacturer, which are designed to span multiple computing systems from that manufacturer.

As each set of files is copied to the staging area, previous copied files with the same name are overridden. Copying to the staging area in sequence ensures the most customized up-to-date product. That is, generic operating system files are copied first. These files are made generically to encompass the largest compatibility. A software application manufacturer, who develops a boot disk image creation software, may add files to update older, generic operating system files. Files that are specific to a brand of computer may be copied to provide a proprietary configuration for the brand of computer. A user of the boot image creation software also has the option of copying user supplied files to the staging area. User supplied files may include files that are required across multiple configurations and configuration files that are specific to a single configuration.

A user is able to further customize the boot disk image using commands privy to the boot disk image creation software. Commands may include the use of a switch with parameters identified by a section. A name of a section may identify the focus of that section. For example, a section name of "[NETWORK]" may indicate the section for modifying network components. Other section names may include "[DELETE_FILES]," "[OEM]," or "[OptionalComponents]." Compiling the files in the staging area creates a customized boot disk image.

By prioritizing files and folders, the threat of corrupting or damaging original source files is eliminated. Additionally, a more flexible boot disk image creation environment is achieved by allowing files from original equipment manufacturers and the user to be copied to the staging area thus further remedying the need to modify the original files. The boot disk image creation environment is further configured through the use of commands which can affect the files themselves, the network, or other components.

Exemplary Systems

Figure 1:
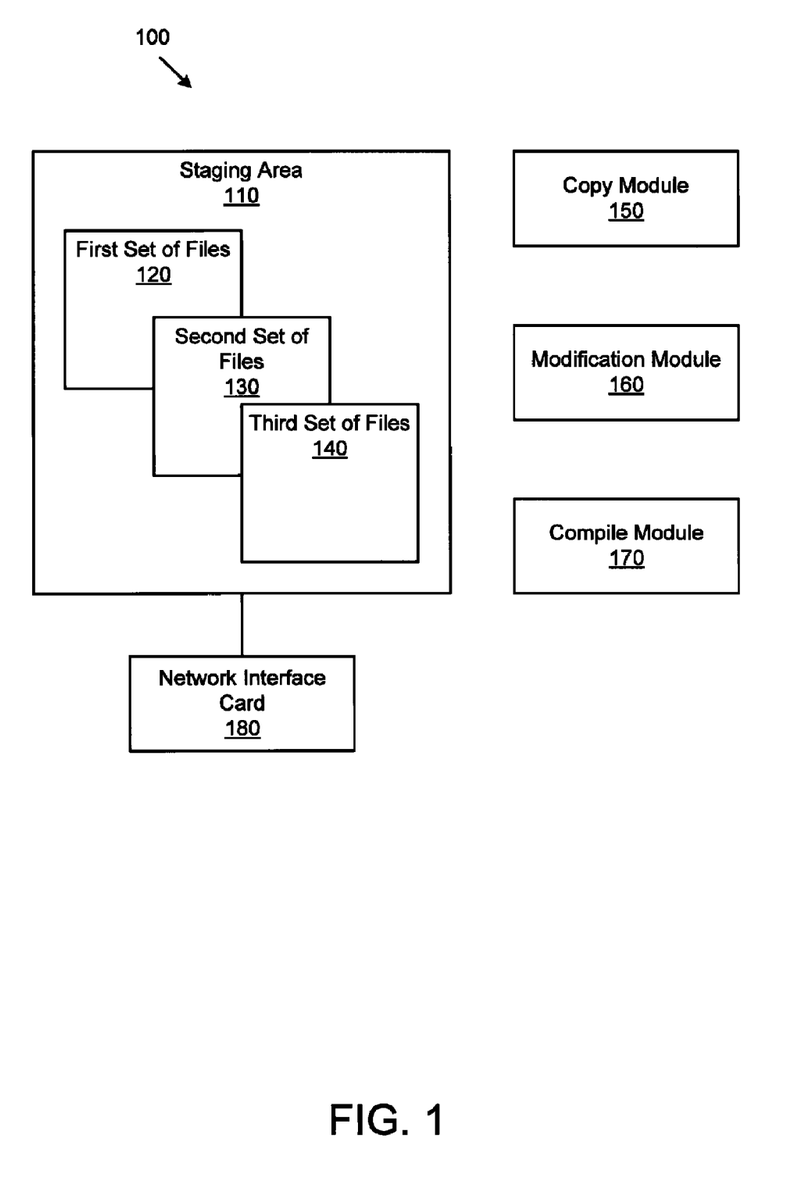
FIG. 1 illustrates an exemplary software system for customizing boot disk images using prioritization.

Turning now to the drawings, FIG. 1 illustrates an exemplary software system 100 for customizing boot disk images using prioritization. As shown, the software configuring system 100 includes a staging area 110, a first set of files 120, a second set of files 130, a third set of files 140, a copy module 150, a modification module 160, a compile module 170, and a network interface card 180. The computing system 100 customizes boot disk images using prioritization eliminating the need to overwrite or change original source files.

In certain embodiments, the software configuring system 100 may include any computer hardware and/or instructions (e.g., software programs), or combinations of software and hardware, configured to perform the processes described herein. In particular, it should be understood that system 100 may include any of a number of well known computing devices, and may employ any of a number of well known computer operating systems, including, but by no means limited to, known versions and/or varieties of Microsoft Windows®, UNIX, Macintosh®, and Linux® operating system software.

Accordingly, the processes described herein may be implemented at least in part as instructions (e.g., one or more computer program products) embodied on one or more computer readable media and executable by one or more computing devices. In general, a processor (e.g., a microprocessor) receives instructions, e.g., from a memory, a computer readable medium, etc., and executes those instructions, thereby performing one or more processes, including one or more of the processes described herein. Such instructions may be stored and transmitted using a variety of known computer readable media.

A computer readable medium (also referred to as a processor readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary software configuring system 100 is shown in FIG. 1, the exemplary components illustrated in FIG. 1 are not intended to be limiting. Indeed, additional or alternative components, implementations, or computing systems may be used to implement the principles and processes described herein.

In one embodiment, the staging area 110 is configured to receive files that will be used to create a boot disk image. The staging area 110 may be configured to override earlier received files with later received files of the same name. The staging area 110 may be located on a computer readable medium of a computing system. In one embodiment, the staging area 110 is located on a different computing system than sets of files 120, 130, and 140. The first, second, and third sets of files 120, 130, 140 may be copied to the staging area in sequence.

The first set of files 120 may include operating system files. Inclusion of the first set of files 120 may be necessary to incorporate a selected operating system with the boot disk image. The second set of files 130 may include files supplied by a boot disk image creation software manufacturer. The second set of files 130 may update one or more files in the first set of files 120. The second set of files 130 may add to or override the first set of files 120. The third set of files 140 may include files supplied by an original equipment manufacturer. The third set of files 140 may add to or override the first and second sets of files 120, 130. The third set of files 140 may be configured specifically for a brand of computers, such that selection of the third set of files 140 will install correct files for machines produced by the original equipment manufacturer.

In certain embodiments, additional user supplied files are copied to the staging area 110. The user supplied files may include files that are common across multiple configurations or specific to a single configuration.

The copy module 150 may be configured to copy files to the staging area. The copy module 150 may be configured to use a location on the same computing system or access a network resource to copy files to the staging area 110. The first, second, and third sets of files 120, 130, 140 may reside on different storage media thus making use of at least one network resource along with at least one local media to copy files from.

The modification module 160 may be configured to execute commands. The executed commands may affect components related to the files in the staging area. In one embodiment, the executed commands affect networking components related to creation of the boot disk image. The compile module 170 may be configured to compile the files remaining in the staging area after the copy module 150 has completed copying files. The compilation of files in the staging area creates the boot disk image or boot disk image.

The network interface card 180 may provide network connectivity for the staging area 110 and copy module 150. The network interface card 180 may connect to any type and number of networks capable of carrying communication signals between connected devices, including but not limited to one or more local area networks, wide area networks, intranets, or the Internet.

Figure 2:
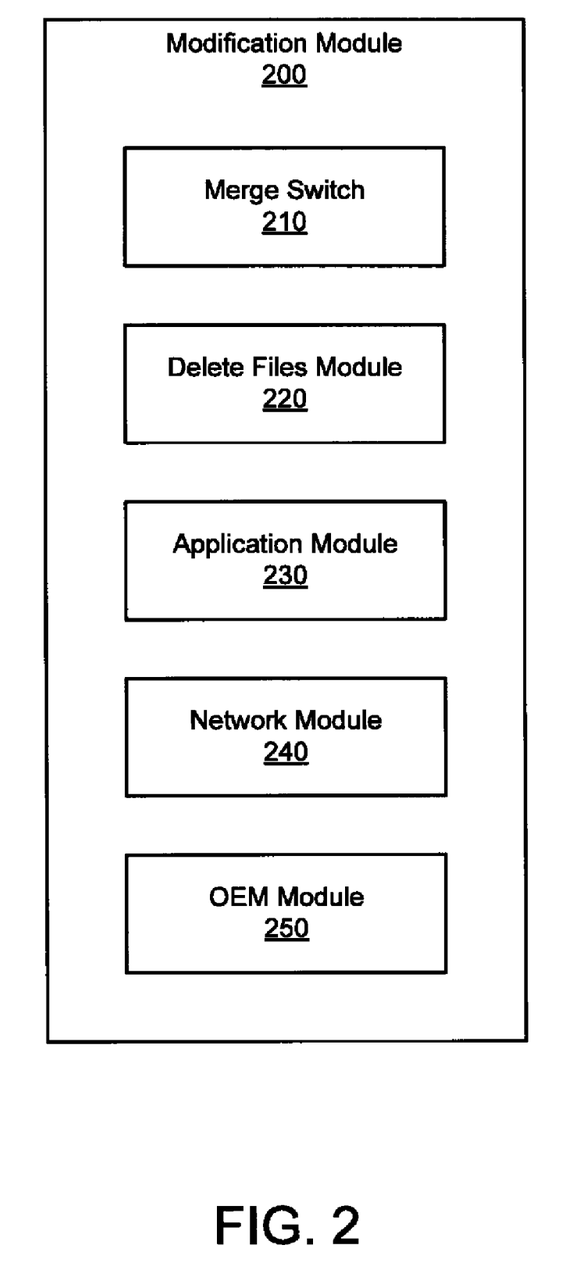
FIG. 2 illustrates components of an exemplary modification module of a boot disk creation module.

FIG. 2 illustrates components of an exemplary modification module of a boot disk creation module. The modification module 200 includes a merge switch 210, a delete files module 220, an application module 230, a network module 240, and an OEM module 250. As shown, the modification module 200 modifies the files in the staging area 110 and modifies network components.

The merge switch 210 may be configured to merge a user supplied command with a preexisting default command. The merge switch 210 is a switch that may be used in a command section to modify the boot disk image.

The delete files module 220 may be configured to delete undesired files from the staging area that remain after all the sets of files have been copied. The delete files module 220 may not affect the original source files since only a copy or a mapping resides in the staging area. The merge switch 210 may be used within the delete files module 220 to merge a command to delete a file from the default location as well as a non-default location. The delete files module 220 may also be configured to accept commands to spare a file from being deleted by default. In one embodiment, the delete files module 220 does not delete any files if the module is identified, but left empty (i.e., without commands).

In one embodiment, the application module 230 is configured to accept commands used to automate the default inclusion of an original equipment manufacturer in the boot disk image. The network module 240 may be configured to accept entries resulting in drive mappings. A drive mapping may be to a network resource to copy files from. The merge switch 210 may be used in the network module to map more than one resource.

The OEM module 250 may be configured to allow the user to select one or more original equipment manufacturers' sets of files and prioritize the order in which these sets of files are processed. In one embodiment, the OEM module 250 is configured to expressly leave out a set of files from an original equipment manufacturer. The OEM module 250 may be configured to prioritize vendors according to the order listed.

Figure 3:
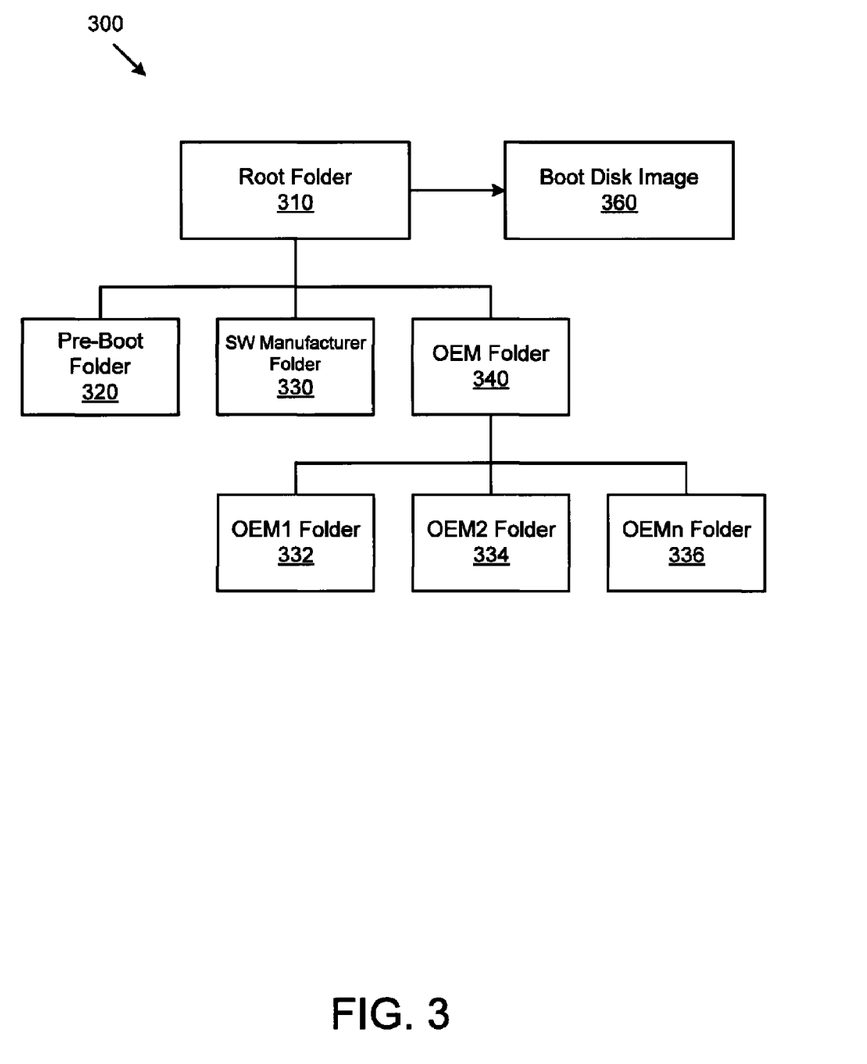
FIG. 3 illustrates components of an exemplary nested folder structure.

FIG. 3 illustrates components of an exemplary nested folder structure 300. The nested folder structure 300 includes a root folder 310, a pre-boot folder 320, a software manufacturer folder 330, an OEM folder 340, and a boot disk image 350. The nested folder structure 300 facilitates prioritization of files and creation of the boot disk image 350.

The root folder 310 may be configured so that all files in it and selected subfolders and subfiles of the root folder 310 are included in the boot disk image 350. In one embodiment, the nested folder structure 300 represents the sequence of files copied to the staging area. For example, files in the Pre-boot folder 320 will be overridden by files of the same name in the OEMn folder 346 because it is further nested and occurs later in sequence.

The pre-boot folder 320 may be configured to include files for an operating system. The pre-boot folder may include files for Windows PE®, Linux®, DOS®, or the like. The software manufacturer folder 330 may be configured to include files supplied by the software manufacturer of the boot disk creator. The files may include updated files since files residing in the software manufacturer folder 330 will override files in the pre-boot folder 320 when copied to the staging area 110.

The OEM folder 340 may include folders containing files from original equipment manufacturers. The OEM Folder 340 may be configured as a mount point. In the depicted embodiment, the folders containing files from original equipment manufacturers are named OEM1 folder 342, OEM2 Folder 344, and OEMn Folder 346. Folders 342, 344, and 346 may be named after the original equipment manufacturer or may be given a user specified name. Each set of files from an original equipment manufacturer is stored in the applicable folder within the OEM folder 340.

Exemplary Method

Figure 4:
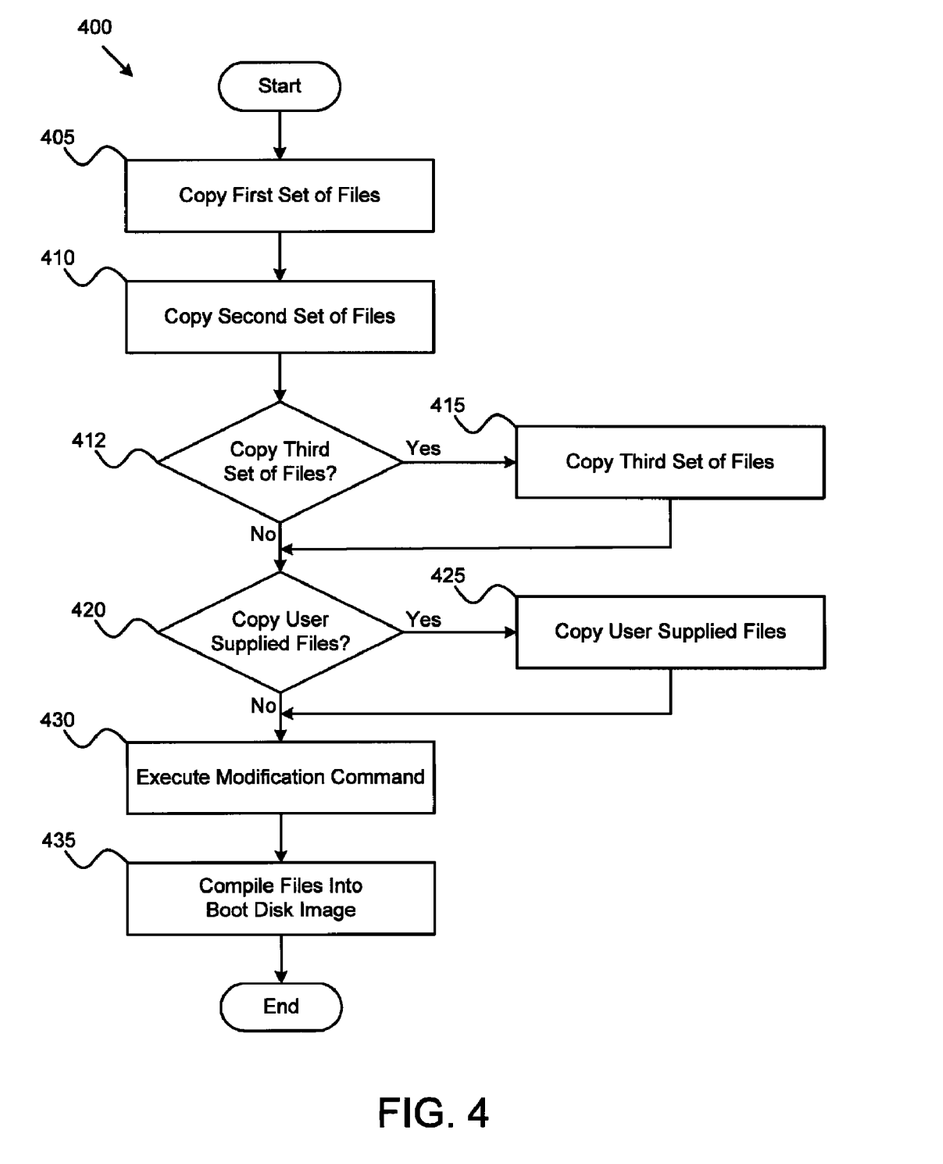
FIG. 4 illustrates an exemplary boot image configuration method.

FIG. 4 illustrates an exemplary boot image configuration method. As shown, the method 400 includes copying 405 a first set of files, copying 410 a second set of files, ascertaining 412 whether a third set of files needs to be copied, copying 415 a third set of files, ascertaining 420 whether user supplied files need to be copied, copying 425 user supplied files, executing 430 one or more modification commands, and compiling 435 the files into a boot disk image. The method 400 illustrates exemplary acts according to one embodiment; other embodiments may omit, add to, reorder, and/or modify any of the acts shown in FIG. 4.

In step 405, a first set of files is copied. The first set of files, as with any other set of files, may be copied to a staging area. The first set of files, as with any other set of files, may be copied from a local storage medium, network resource, removable storage medium, or the like. Step 405 may include copying files of an operating system.

In step 410, a second set of files is copied. The second set of files may override earlier copied files in the staging area with the same name. In step 412, it is determined whether a third set of files needs to be copied. Step 412 may be triggered by an indicator selected by a user. If a third set of files needs to copied, then in step 415, a third set of files is copied. The third set of files may override earlier copied files in the staging area with the same name.

In step 420, it is determined whether user supplied files need to be copied. Step 420 may be triggered by an indicator selected by a user. If user supplied files need to be copied, then in step 425, the user supplied files are copied. The user supplied files may be copied to the staging area. The user supplied files may override earlier copied files in the staging area with the same name. In one embodiment, the user supplied files are configured according to user specifications. A user supplied file may be a common file shared across multiple configurations. In one embodiment, a user supplied file may be specific to a single configuration.

In step 430, the modification command is executed. The modification command may run one or more commands that affect the boot disk image. Step 430 may execute commands indicated by the user. In one embodiment, step 430 executes default commands. A command may remove files from the staging area to make the boot disk image smaller in size. In step 435, the files in the staging area are compiled to create the boot disk image.

Exemplary Computer Program Products

Figure 5:
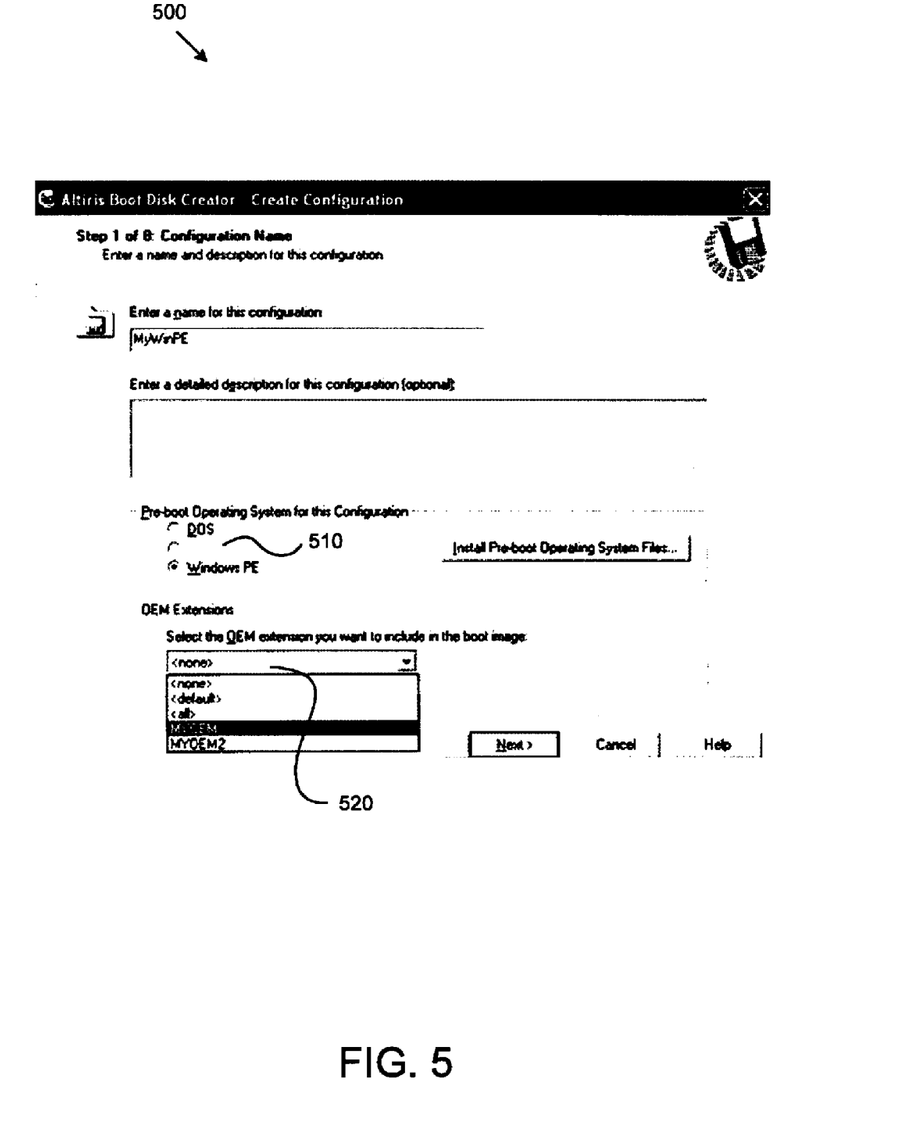
FIG. 5 illustrates an exemplary interface for customizing boot disk images using prioritization.

FIG. 5 illustrates an exemplary interface for customizing boot disk images using prioritization. The interface 500 includes an operating system selection control 510 and an original equipment manufacturer selection control 520. The interface 500 enables a user to select options to create a boot disk.

The operating system selection control 510 may be configured to display available operating systems to incorporate into the boot disk image. In the depicted embodiment, the DOS® and Windows PE® selections are available to the user, but the Linux® selection is not. An operating system may not be available to a user if the operating system files are not available. A user may use the operating system selection control 510 to select a desired operating system.

The original equipment manufacturer selection control 520 may be configured to display at least one set of files provided by a particular original equipment manufacturer (OEM). The user may have an option to select an individual OEM. The user may have an option to select all OEMs available. The user may have an option to select none of the OEMs available. By providing an OEM folder to be incorporated into the boot disk image, the original source files are preserved for other boot disk images.

Figure 6:
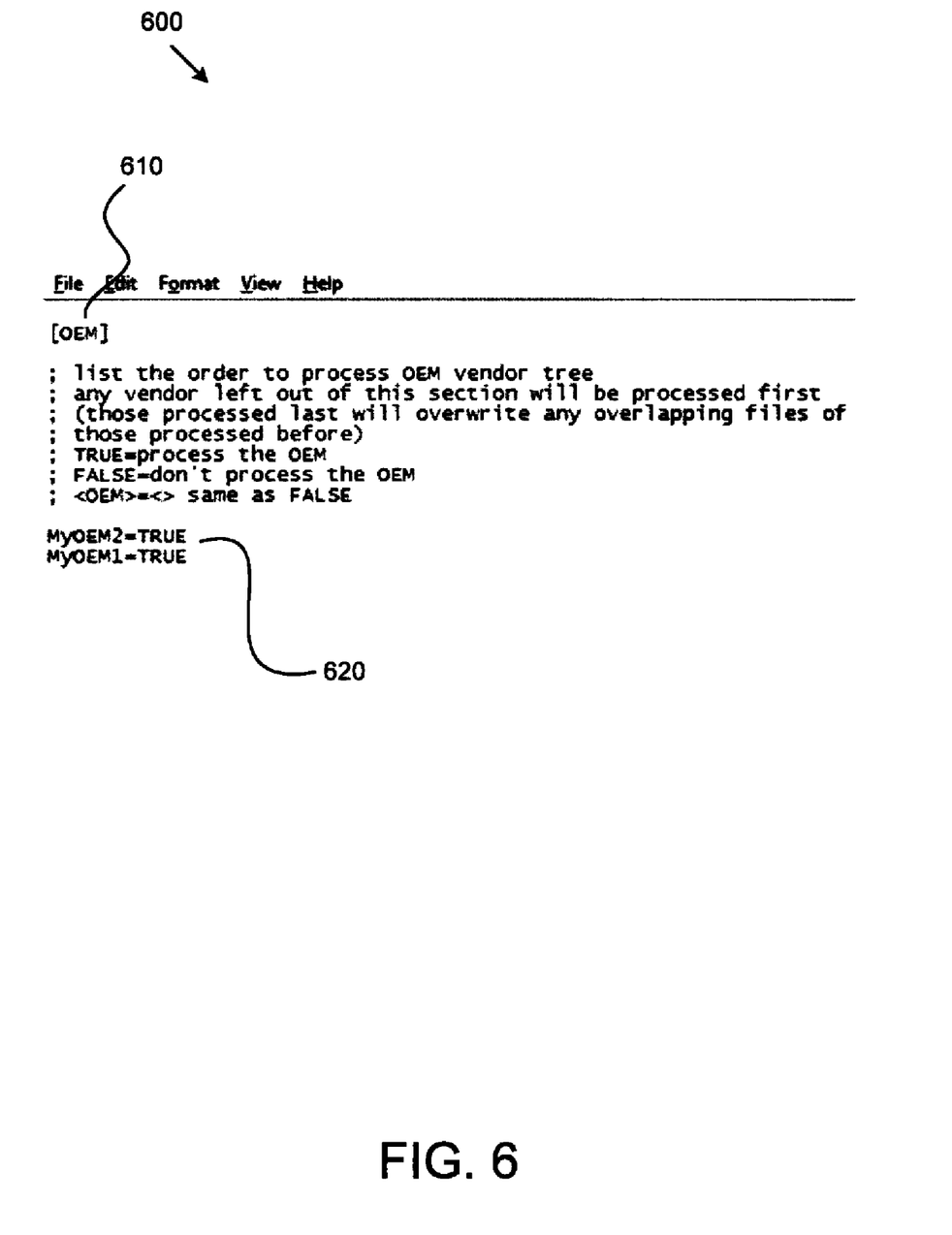
FIG. 6 illustrates an exemplary command structure for modifying a boot disk image.

FIG. 6 illustrates an exemplary command structure for modifying a boot disk image. The command structure 600 includes a specifier 610 and execution statement 620. The depicted command structure 600 allows the user to prioritize files for configuring a boot disk image.

The specifier 610 may identify statements that a compiler should expect when compiling the command. Available specifiers may include a networking specifier, a file handling specifier, an application specifier, an OEM specifier, or the like. The networking specifier may include statements to modify a network configuration such as mapping a network drive. The file handling specifier may include statements to handle files such as deleting a file, not deleting a file, and the like. The application specifier may include statements to auto-select selection controls. The depicted specifier 610 is an OEM specifier which includes commands dealing with the sets of files from OEMs. In the OEM selection control 520, a user may select to have one, all, or none of the sets of OEM files included in the boot disk image. The OEM specifier may dictate to the compiler how to prioritize that selection.

The execution statement 620 may indicate to the compiler what needs to be executed. Statements in the network section may indicate what network resources to map, whether to merge the network resources, whether to override default settings, and the like. Statements in the file handling section may indicate what files to delete, what files not to delete, whether to merge the deleted files with a default path, and the like. The application section may indicate what selection controls to manipulate in the boot disk creation software application. The depicted statements indicate what sets of OEM folders are being dealt. The OEM execution statements 620 may indicate whether to process a particular OEM folder. In one embodiment, an ordered listing of OEM folders in the OEM specifier indicates an order to process the OEM folders. Later processed files override earlier processed files of the same name.

The preceding description has been presented only to illustrate and describe exemplary embodiments and implementations with reference to the accompanying drawings. It will, however, be evident that various modifications and changes may be made thereto, and additional implementations may be implemented, without departing from the scope of the invention as set forth in the claims that follow. The above description and accompanying drawings are accordingly to be regarded in an illustrative rather than a restrictive sense.

What is claimed is:

1. A computer-implemented method for customizing boot disk images using prioritization, at least a portion of the method being performed by a computing device comprising at least one processor, the method comprising:
   providing a staging area configured to receive files for creating a customized boot disk image, wherein the staging area is configured such that later received files override previously received files of the same name;
   providing a nested folder structure;
   assigning a prioritization order to the nested folder structure, wherein the prioritization order specifies that higher-level folders within the nested folder structure are to be processed before lower-level folders within the nested folder structure;
   copying a plurality of sets of files from the nested folder structure into the staging area based on the prioritization order assigned to the nested folder structure such that files copied from lower-level folders within the nested folder structure into the staging area override files of the same name that were previously copied from higher-level folders within the nested folder structure into the staging area;
   executing a set of modification commands to perform at least one modification to the contents of the staging area;
   compiling the contents of the staging area to create the customized boot disk image.

2. The method of claim 1, wherein the plurality of sets of files comprise at least one of:
   a set of files corresponding to an operating system;
   a set of files provided by a software manufacturer;
   a set of files provided by an original equipment manufacturer;
   a set of files provided by a user to perform user-customized functions;
   a set of files corresponding to a single computer configuration;
   a set of files corresponding to a plurality of computer configurations.

3. The method of claim 2, wherein at least one of:
   the set of files provided by the software manufacturer are stored within the nested folder structure at a lower level than the set of files corresponding to the operating system;
   the set of files provided by the original equipment manufacturer are stored within the nested folder structure at a lower level than the set of files provided by the software manufacturer;
   the set of files provided by the user are stored within the nested folder structure at a lower level than the set of files provided by the original equipment manufacturer.

4. The method of claim 1, wherein copying the plurality of sets of files comprises copying the plurality of sets of files from at least one network location.

5. The method of claim 1, wherein the staging area is located on a computer readable medium.

6. The method of claim 1, wherein at least a portion of the prioritization order is provided by a user.

7. The method of claim 1, wherein the set of modification commands comprises at least one of:
   a set of default commands;
   a set of user-provided commands.

8. The method of claim 1, wherein the set of modification commands comprises a switch with a parameter located in a command section.

9. The method of claim 1, further comprising, prior to copying the plurality of sets of files from the nested folder structure into the staging area, enabling a user to specify at least one of:
   files corresponding to an operating system that are to be used when creating the customized boot disk image;
   files provided by a software manufacturer that are to be used when creating the customized boot disk image;
   files provided by an original equipment manufacturer that are to be used when creating the customized boot disk image;
   commands that are to be executed when creating the customized boot disk image;

files corresponding to a single computer configuration that are to be used when creating the customized boot disk image;

files corresponding to a plurality of computer configurations that are to be used when creating the customized boot disk image.

10. A system for customizing boot disk images using prioritization, the system comprising:

a staging area configured to receive files for creating a customized boot disk image, wherein the staging area is configured such that later received files override previously received files of the same name;

a nested folder structure to which a prioritization order has been assigned, wherein the prioritization order specifies that higher-level folders within the nested folder structure are to be processed before lower-level folders within the nested folder structure;

a copy module programmed to copy a plurality of sets of files from the nested folder structure into the staging area based on the prioritization order assigned to the nested folder structure such that files copied from lower-level folders within the nested folder structure into the staging area override files of the same name that were previously copied from higher-level folders within the nested folder structure into the staging area;

a modification module programmed to execute a set of modification commands to perform at least one modification to the contents of the staging area;

a compile module programmed to compile the contents of the staging area to create the customized boot disk image;

memory and at least one processor configured to execute the copy module, the modification module, and the compile module.

11. The system of claim 10, wherein the plurality of sets of files comprise at least one of:

a set of files corresponding to an operating system;
a set of files provided by a software manufacturer;
a set of files provided by an original equipment manufacturer;
a set of files provided by a user to perform user-customized functions;
a set of files corresponding to a single computer configuration;
a set of files corresponding to a plurality of computer configurations.

12. The system of claim 11, wherein at least one of:
the set of files provided by the software manufacturer are stored within the nested folder structure at a lower level than the set of files corresponding to the operating system;
the set of files provided by the original equipment manufacturer are stored within the nested folder structure at a lower level than the set of files provided by the software manufacturer;
the set of files provided by the user are stored within the nested folder structure at a lower level than the set of files provided by the original equipment manufacturer.

13. The system of claim 10, wherein the copy module is programmed to copy the plurality of sets of files by copying the plurality of sets of files from at least one network location.

14. The system of claim 10, wherein the staging area is located on a computer readable medium.

15. The system of claim 10, wherein at least a portion of the prioritization order is provided by a user.

16. The system of claim 10, wherein the set of modification commands comprises at least one of:
a set of default commands;
a set of user-provided commands.

17. The system of claim 10, wherein the set of modification commands comprises a switch with a parameter located in a command section.

18. The system of claim 10, further comprising a control module programmed to enable a user to specify at least one of:

files corresponding to an operating system that are to be used when creating the customized boot disk image;
files provided by a software manufacturer that are to be used when creating the customized boot disk image;
files provided by an original equipment manufacturer that are to be used when creating the customized boot disk image;
commands that are to be executed when creating the customized boot disk image;
files corresponding to a single computer configuration that are to be used when creating the customized boot disk image;
files corresponding to a plurality of computer configurations that are to be used when creating the customized boot disk image.

19. A non-transitory computer readable medium comprising computer-executable instructions that, when executed by at least one processor of a computing device, cause the computing device to:

provide a staging area configured to receive files for creating a customized boot disk image, wherein the staging area is configured such that later received files override previously received files of the same name;

provide a nested folder structure;

assign a prioritization order to the nested folder structure, wherein the prioritization order specifies that higher-level folders within the nested folder structure are to be processed before lower-level folders within the nested folder structure;

copy a plurality of sets of files from the nested folder structure into the staging area based on the prioritization order assigned to the nested folder structure such that files copied from lower-level folders within the nested folder structure into the staging area override files of the same name that were previously copied from higher-level folders within the nested folder structure into the staging area;

execute a set of modification commands to perform at least one modification to the contents of the staging area;

compile the contents of the staging area to create the customized boot disk image.

* * * * *